April 22, 1924.
J. HANDSEL
AUTOMOBILE BUMPER
Filed March 12, 1923
1,491,231
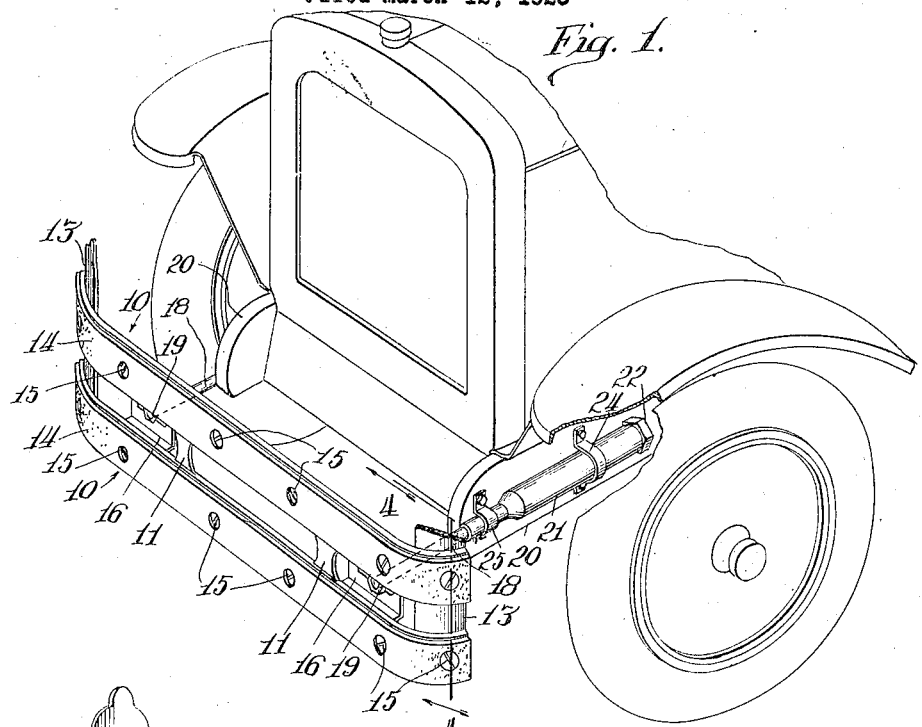
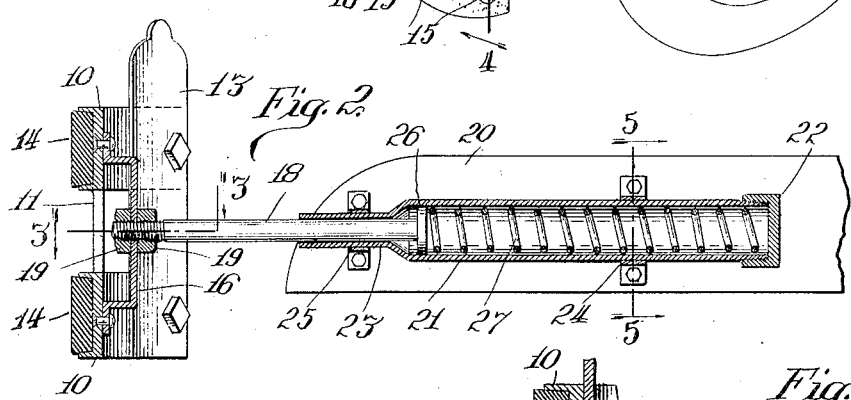
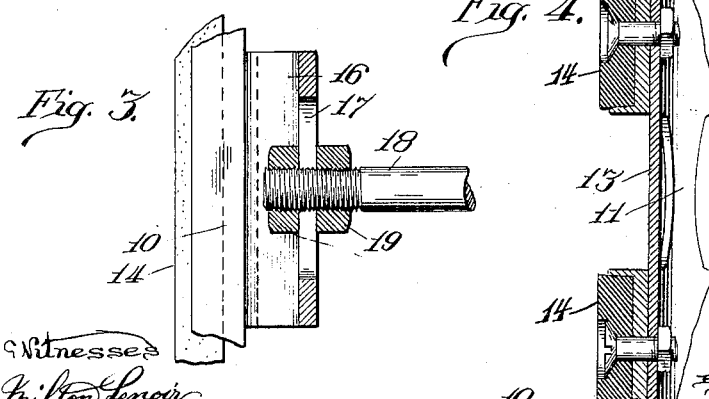
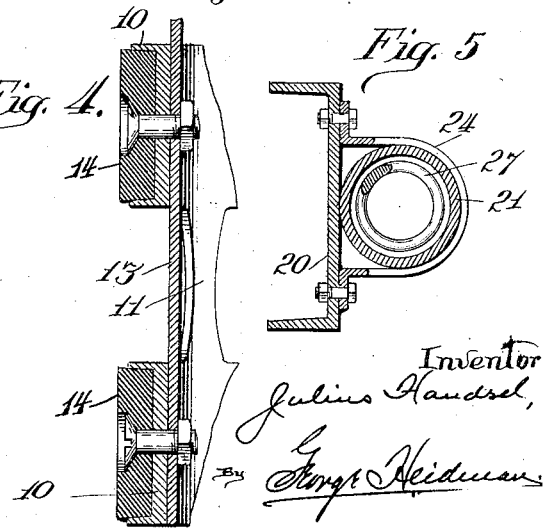
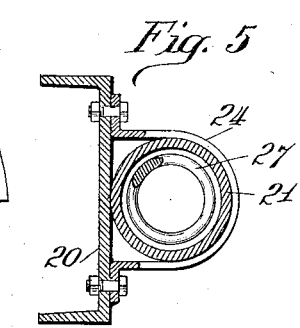
Inventor
Julius Handsel,
By George Heidman
Attorney
Witnesses
Milton Lenoir
F. O. Ferrell Patented Apr. 22, 1924.

1,491,231

UNITED STATES PATENT OFFICE.

JULIUS HANDSEL, OF SOUTH CHICAGO, ILLINOIS.

AUTOMOBILE BUMPER.

Application filed March 12, 1923. Serial No. 624,657.

*To all whom it may concern:*

Be it known that I, JULIUS HANDSEL, a subject of Austria, and a resident of South Chicago, in the county of Cook and State of Illinois, have invented certain new and useful Improvements in Automobile Bumpers, of which the following is a description, reference being had to the accompanying drawing, which forms a part of my specification.

My invention relates to bumpers for automobiles, trucks and the like, adapted to be secured at the front and rear ends of the chassis in order to absorb bumps or shocks that may be encountered when colliding with other objects or vehicles; the invention having for its object the provision of a construction yieldingly secured in place so as to completely absorb any shocks that may be encountered parallel with the longitudinal axis of the chassis of the vehicle or whether in the nature of a side glance or blow at the front or rear end of the vehicle.

The invention has for its object the provision of a bumper which is simple in construction; possessing the necessary strength; which may be readily applied to the chassis of a motor-driven vehicle and which may be quickly adjusted, within given range, to any variations in width of the chassis.

The objects and advantages of my invention will be more readily comprehended from the detailed description of the drawings, wherein:—

Figure 1 is a perspective view of the front end of an automobile with my improved bumper secured in place.

Figure 2 is a longitudinal sectional view through one end of my improved bumper.

Figure 3 is a detail sectional view taken on the line 3—3 of Figure 2 looking in the direction of the arrows.

Figure 4 is a detail sectional view taken on the line 4—4 of Figure 1 looking in the direction of the arrows.

Figure 5 is a cross sectional view taken on the line 5—5 of Figure 2 looking in the direction of the arrows.

In the particular exemplification of the invention, the main or body portion of the bumper consists of channel members or portions 10, 10 arranged one above the other in spaced relation and integrally secured together or reenforced by connecting webs 11, of any suitable number, spaced apart as shown in Figure 1. The upper and lower channel members or portions 10, 10, with the webs 11, may either be formed out of a single piece of metal, or the upper and lower portions may be separately constructed and rigidly secured together by the connecting webs 11, by having the latter riveted or otherwise suitably secured to the upper and lower channel members to provide an integral unit. The ends of the channel members or portions 10, 10 are preferably curved slightly rearward as shown and also preferably secured together and reenforced by the upstanding webs or plates 13, 13 which are preferably riveted or otherwise secured to the channel members. The end connecting plates or webs 13 are shown disposed slightly above the uppermost member or channel portion 10 so as to provide the bumper with a more finished appearance.

The members or portions 10, 10 are preferably in the nature of channels for the purpose of receiving a suitable cushioning element or rubber strip 14 of suitable thickness so as to seat in the channel and extend slightly forward of the sides or flanges of the channel portions and thus provide a resilient cushion adapted to absorb light blows or a portion thereof and at the same time prevent injury to the object or vehicle with which the bumper may come into forcible contact. The resilient cushion or rubber element 14 may be secured in the channel portion in any suitable manner, as for example by the countersunk bolts 15.

The rear side of the channel members 10, 10 is provided with a pair of brackets 16, 16 riveted or otherwise suitably secured to the upper and lower channel members 10; the brackets, which are preferably of sheet metal, being formed to extend slightly rearward of the channel portions as shown in Figure 2. Each bracket member 16 is provided with a laterally disposed slot 17 adapted to receive the forward ends of the plungers or piston members 18, 18. The forward ends of the plungers or pistons 18 are preferably removably secured to the bracket members 16 in non-yielding relation therewith in any suitable manner; as, for example, by threading the forward ends of the plungers, which are adapted to extend through the slots 17 in the brackets,—so as to receive suitable nuts 19 on opposite sides of the brackets, of size larger than the width of the slots whereby to firmly hold the channel members on the ends of the plungers or piston members 18.

The side frame members 20, 20 of the chassis of the vehicle are each provided with a cylindrical member or cylinder 21 of suitable length, with the rear end preferably provided with a removable cap as at 22, which may be screwed or otherwise secured in place. The cylindrical members 21 are each preferably provided with a forwardly reduced end as at 23, of size just sufficient to receive the plungers or pistons 18 and permit free sliding movement; the reduced ends 23 being elongated so as to provide sufficient sliding bearing for the plungers or pistons to prevent lateral movement thereof.

The cylindrical members or cylinders 21 may be secured to the side frame members 20 of the chassis in any suitable manner, as for example by means of straps 24 and 25; the straps 24 being disposed adjacent to the rear ends of the cylinders and welded or otherwise secured thereto to prevent longitudinal movement of the cylinders; while the straps 25 are secured about the forward reduced ends 23 of the cylinders; the ends of the straps in turn being bolted or otherwise secured to the side frames 20 of the chassis.

The inner end of each plunger member 18 is preferably enlarged or provided with a head 26 against which one end of a suitable coil spring 27 bears. The springs 27 are adapted to extend throughout the length of the main portion of the cylinders 21 when the bumper is in normal distended position, namely with the springs substantially entirely expanded and the heads of the pistons or plungers at the forward ends of the cylinders as shown in Figure 2; while the rear ends of the springs bear against the closure members or caps 22. The coils of the springs are preferably such that a considerable inward movement of the pistons or plungers may be had without causing a complete "seating" of the springs and thus prevent any possibility of the crystallization of the springs or interference with the desired resiliency thereof.

My improved bumper, as is readily apparent from the drawing, may be quickly assembled and put into place, while removal of any of the parts for repair or replacement is readily permitted; and at the same time any shocks, whether received at an intermediate point on the main portion of the bumper or whether adjacent to the ends, will be completely absorbed by the springs through the inward movement of the plungers or pistons. In addition to the absorption due to the resiliency of the springs, a portion of the shocks will also be absorbed by the cushion element 14, while at the same time marring of the objects with which the bumper contacts will be prevented.

It is understood, of course, that my improved bumper is equally applicable for use at the rear end as well as at the front end of the chassis without change in construction from that disclosed in the drawings.

As previously stated, the upper and lower channel members 10, with any number of connecting webs or plates, may either be made integral throughout or separately formed and suitably riveted or otherwise secured together; while the cushioning element is preferably removably secured in place by suitable bolts as shown in order to permit repair or renewal when occasion requires.

I have shown what I believe to be the best embodiment of my invention which has been described in terms employed merely as terms of description and not as terms of limitation, as structural modifications are possible and may be made without, however, departing from the spirit of my invention.

What I claim is:—

1. A bumper of the character described, comprising a plurality of elongated channel portions arranged one above the other in spaced relation, a cushion element mounted in the channels of said portions, bracket members secured to the rear sides of said channel portions, a pair of cylinders adapted to be secured to the side frame of a vehicle, and plunger members adjustably secured to the bracket members and slidable in the cylinders.

2. A bumper of the character described, comprising a plurality of elongated channel portions arranged one above the other in spaced relation, a cushion element removably mounted in the channels of said portions so as to extend forward thereof, connecting plates or webs whereby the spaced relation of said channel portions is maintained, bracket members arranged transversely of the rear sides of the channel portions and provided with elongated slots, a pair of cylinders adapted to be secured to the side frame of a vehicle, and plunger members, the outer ends whereof are adjustably secured in the slots of the bracket members while the other ends are slidably mounted in said cylinders.

3. A bumper of the character described, comprising a pair of channel members having rearwardly curved ends and arranged one above the other in spaced relation, web portions whereby said members are maintained in spaced relation and both members made to move together, a pair of bracket members extending from one channel member to the other, the intermediate portion of each bracket member being slotted transversely, a pair of cylinders adapted to be secured to the side frame of a vehicle, a pair of plunger members whose outer ends are adjustably secured in the slots of the bracket members while the opposite ends are slidable in said cylinders, and cushioning means arranged intermediate of the ends of the plungers and the closed ends of the cylinders.

4. A bumper of the character described, comprising channel members arranged in vertical spaced relation and connected together by web portions, a resilient cushioning element removably secured in the channel of each member so as to extend forward thereof, bracket members secured to the rear sides of the channel members and provided with laterally arranged openings, a pair of cylinders adapted to be secured to the side frame of a vehicle, each cylinder being provided with an elongated reduced forward end and a removable closure for the opposite end, a pair of plunger members whose outer ends are adjustably secured in the openings of said bracket members, while the opposite ends extend through the reduced ends of the cylinders, and expansion springs in said cylinders whereby the plungers are yieldingly forced outward into normal position.

5. A bumper of the character described, comprising an elongated body portion, of channel formation, adapted to be disposed transversely at the end of a vehicle, resilient cushioning means secured in the channel portion to provide a vertically disposed flat forward surface, a pair of bracket members secured to the rear side of the body portion and each provided with a transversely disposed slot, a pair of cylinders adapted to be secured to the side frame members of a vehicle, each cylinder being provided with a reduced opening at the forward end and a removable closure at the rear end, plunger members, the outer end of each plunger member being removably and adjustably secured in the slot of the corresponding bracket member to permit lateral adjustment of the cylinders and plungers relative to the body portion, while the opposite end of each plunger member is provided with a head larger than the reduced openings at the forward ends of the cylinders, the plungers being slidable in said cylinders, and compression springs in said cylinders intermediate of the closed ends thereof and the heads of the plungers.

JULIUS HANDSEL.

Witnesses:
G. HEIDMAN,
F. A. FLORELL.